United States Patent
Yamamoto et al.

(10) Patent No.: US 10,162,946 B2
(45) Date of Patent: Dec. 25, 2018

(54) DATA MANAGEMENT SYSTEM, DATA MANAGEMENT METHOD, AND RECORDING MEDIUM STORING DATA MANAGEMENT PROGRAM

(71) Applicants: Ryouji Yamamoto, Kanagawa (JP); Hiroshi Kobayashi, Kanagawa (JP); Atsushi Kokubo, Kanagawa (JP); Hidekazu Segawa, Kanagawa (JP); Yuki Takaya, Kanagawa (JP)

(72) Inventors: Ryouji Yamamoto, Kanagawa (JP); Hiroshi Kobayashi, Kanagawa (JP); Atsushi Kokubo, Kanagawa (JP); Hidekazu Segawa, Kanagawa (JP); Yuki Takaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 117 days.

(21) Appl. No.: 15/249,907

(22) Filed: Aug. 29, 2016

(65) Prior Publication Data
US 2017/0076074 A1 Mar. 16, 2017

(30) Foreign Application Priority Data
Sep. 15, 2015 (JP) ................................. 2015-181587

(51) Int. Cl.
*G06F 21/16* (2013.01)
*H04L 29/06* (2006.01)
(Continued)

(52) U.S. Cl.
CPC .............. *G06F 21/16* (2013.01); *H04L 63/10* (2013.01); *H04L 63/107* (2013.01); *H04L 67/18* (2013.01);
(Continued)

(58) Field of Classification Search
CPC ........ H04L 63/12; H04L 63/107; H04W 12/06
See application file for complete search history.

(56) References Cited

U.S. PATENT DOCUMENTS

| 2012/0159156 A1 | 6/2012 | Barham et al. |
| 2014/0304784 A1 | 10/2014 | Harrison |

(Continued)

FOREIGN PATENT DOCUMENTS

| JP | 2008-9253 | 1/2008 |
| JP | 2015-8381 | 1/2015 |

OTHER PUBLICATIONS

Extended European Search Report dated Nov. 21, 2016 in European Patent Application No. 16187577.8.

*Primary Examiner* — Dao Q Ho
(74) *Attorney, Agent, or Firm* — Oblon, McClelland, Maier & Neustadt, L.L.P.

(57) ABSTRACT

A data management system includes a detecting apparatus that detects an information processing apparatus and a server apparatus that controls access to data by the information processing apparatus. The detecting apparatus detects the information processing apparatus located within a predetermined area. The server apparatus includes a transmitter that transfers data to the detected information processing apparatus, the data being associated with access authority indicating whether or not the information processing apparatus is allowed to access the data, and circuitry that controls an access to the data from the detected information processing apparatus in accordance with the access authority associated with the data.

7 Claims, 8 Drawing Sheets

(51) Int. Cl.
  *H04W 12/06* (2009.01)
  *H04W 4/02* (2018.01)
  *H04W 12/08* (2009.01)
  *H04L 29/08* (2006.01)

(52) U.S. Cl.
  CPC ............. *H04W 4/02* (2013.01); *H04W 12/06* (2013.01); *H04W 12/08* (2013.01); *H04L 67/10* (2013.01)

(56) References Cited

U.S. PATENT DOCUMENTS

2014/0344420 A1 11/2014 Rjeili et al.
2014/0375750 A1 12/2014 Yoshida

DATA MANAGEMENT SYSTEM, DATA MANAGEMENT METHOD, AND RECORDING MEDIUM STORING DATA MANAGEMENT PROGRAM

CROSS-REFERENCE TO RELATED APPLICATION

This patent application is based on and claims priority pursuant to 35 U.S.C. § 119(a) to Japanese Patent Application No. 2015-181587, filed on Sep. 15, 2015 in the Japan Patent Office, the entire disclosure of which is hereby incorporated by reference herein.

BACKGROUND

Technical Field

The present invention relates to a data management system, a data management method, and a non-transitory recording medium storing a data management program.

Background Art

The recent data management system detects various information processing devices such as tablet devices, personal computers (PCs), smartphones, mobile music players, and mobile audio players etc. located in a predetermined area, and transfers data such as image data, audio data, and document data etc. to the information processing devices.

In the data management system described above, if a user wants to receive data at an information processing device owned by the user, since it is required that the information processing device is located in the predetermined area, the user moves into the predetermined area with his/her information processing device.

SUMMARY

Example embodiments of the present invention provide a novel data management system includes a detecting apparatus that detects an information processing apparatus and a server apparatus that controls access to data by the information processing apparatus. The detecting apparatus detects the information processing apparatus located within a predetermined area. The server apparatus includes a transmitter that transfers data to the detected information processing apparatus, the data being associated with access authority indicating whether or not the information processing apparatus is allowed to access the data, and circuitry that controls an access to the data from the detected information processing apparatus in accordance with the access authority associated with the data.

Further example embodiments of the present invention provide a method of managing data and a non-transitory recording medium storing a data management program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the known data management system described before, even if the user leaves from the predetermined area with his/her information processing device, the data transferred in the predetermined area remains stored in the information processing device, such that the user may copy, distribute, or publish the data.

In this case, the data stored in the information processing device may be data that includes confidential information or data that it is required to be licensed from a copyright holder to copy, distribute, or publish. Accordingly, there is a risk that the confidential information may be leaked or the rights of the copyright holder may be encroached.

In this embodiment, if information processing devices such as the tablet device, PC, smartphone, mobile music player, and mobile audio player etc. are located in a predetermined area, a data management system that transfers data such as image data, audio data, and document data etc. to the information processing devices is described.

In the data management system in this embodiment, it is possible to view and listen to contents such as video, music, and document by playing back the contents on the information processing device based on the transferred data.

Especially, in this embodiment, as an example of the data management system, a video display system that displays same video as video projected by a projector located at a conference room, lecture room, and event hall etc. on the information processing device located in the predetermined area is described below.

In the video display system, if a user wants to browse same video as video projected by the projector on the information processing device, since it is required that the information processing device is located in the predetermined area, the user moves into the predetermined area with the information processing device.

After the user moves into the predetermined area with the information processing device, image data of the video projected by the projector is transferred to the information processing device, and the video is played back based on the image data.

In this case, in the known video display system, if the user leaves from the predetermined area with the information processing device after browsing the video etc. and the image data is not deleted, the image data acquired in the predetermined area is still stored in the information processing device. In this case, it is possible that general public or third party acquires the image data stored in the information processing device, and it is possible that the contents based on the data is published to general public or third party.

As a result, if the data stored in the information processing device is data that includes confidential information or data that it is required to be licensed from a copyright holder to copy, distribute, and publish, it is possible that the confidential information is leaked and the rights of the copyright holder is encroached.

It is possible to resolve the issue described above by having the image data deleted when the user leaves from the predetermined area. However, in some cases, it is laborious to delete the image data, and not all users delete the image data. In those cases, the method described above is not effective.

To cope with this issue, in the video display system in this embodiment, access authority information indicating whether or not it is prohibited to copy or store is added to the image data. Regarding the image data whose access authority is to prohibit copying or prohibit storing, the image data is deleted from the information processing device when the user leaves from the predetermined area with the information processing device.

As a result, in the video display system in this embodiment, it is possible to limit handling the image data on the system, and it is possible to delete the image data surely without user operation.

Figure 1:
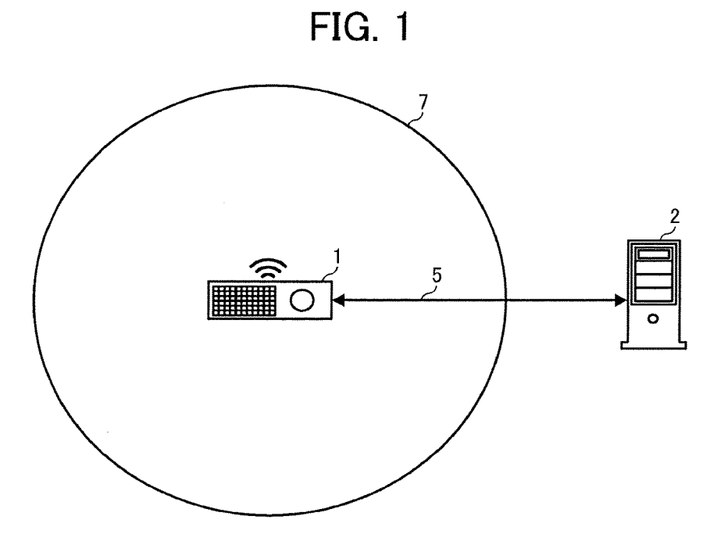
FIG. 1 is a diagram illustrating a video display system as an embodiment of the present invention.
Figure 2:
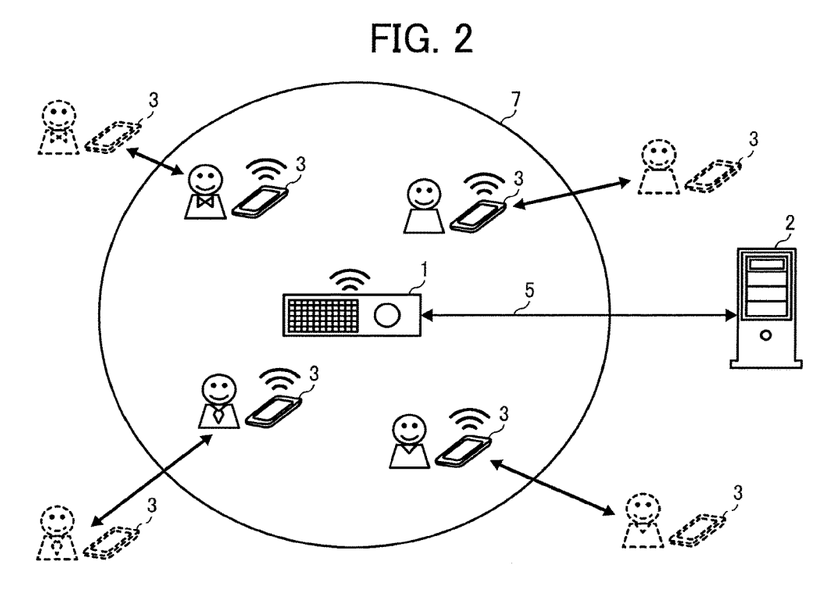
FIG. 2 is a diagram illustrating a video display system as an embodiment of the present invention.

First, an operation of a video display system in this embodiment is described below with reference to FIGS. 1 and 2. FIGS. 1 and 2 are diagrams illustrating the video display system in this embodiment.

As illustrated in FIG. 1, in the video display system in this embodiment, a projector 1 is connected to a data server 2 via a network 5.

The data server 2 stores the image data and transfers the image data to the projector 1 on demand via the network 5.

In accordance with the input image data, the projector 1 forms an optical image by modulating a light flux emitted from a light source and projects the formed projection image on a projection surface such as a wall and screen etc. In this embodiment, the video is projected based on the image data transferred by the data server 2.

In addition, for example, the projector 1 includes a short-range wireless communication function such as Bluetooth Low Energy (BLE), Bluetooth, and wireless fidelity (Wi-Fi) etc., and the projector 1 can communicate with another apparatus including the short-range wireless communication function located in a predetermined area 7. That is, the projector 1 can communicate with other apparatus within the predetermined area 7 where radio wave of the short-range wireless communication reaches. However, outside the predetermined area 7, the projector 1 cannot communicate with the other apparatus since the radio wave does not reach.

As a result, as illustrated in FIG. 2, after a user moves into the predetermined area 7 with the information processing device 3, the projector 1 can communicate with the information processing device 3 using the short-range wireless communication. By contrast, after the user leaves from the predetermined area 7 with the information processing device 3, the communication between the projector 1 and the information processing device 3 is disconnected.

The information processing device 3 is an information processing device owned by the user and implemented by an information processing apparatus such as a PC, personal digital assistant (PDA), smartphone, and tablet device etc.

In case of viewing the same video as the video projected by the projector 1 on the information processing device 3, it is required to move into the predetermined area 7 with the information processing device 3 at hand since it is required that the information processing device 3 is located in the predetermined area 7.

After the user moves into the predetermined area with the information processing device 3 at hand, image data of the video projected by the projector is transferred to the information processing device 3, and the video is played back based on the image data.

For example, the network 5 is an intranet such as an office local area network (LAN) etc., and it is possible to implement the network 5 using a network compatible with interfaces such as Ethernet, Universal Serial Bus (USB), Bluetooth, Wi-Fi, FeliCa, Peripheral Component Interconnect express (PCIe), Video Graphics Array (VGA), Digital Visual Interface (DVI), and the Institute of Electrical and Electronics Engineers (IEEE) standard etc.

Figure 3:
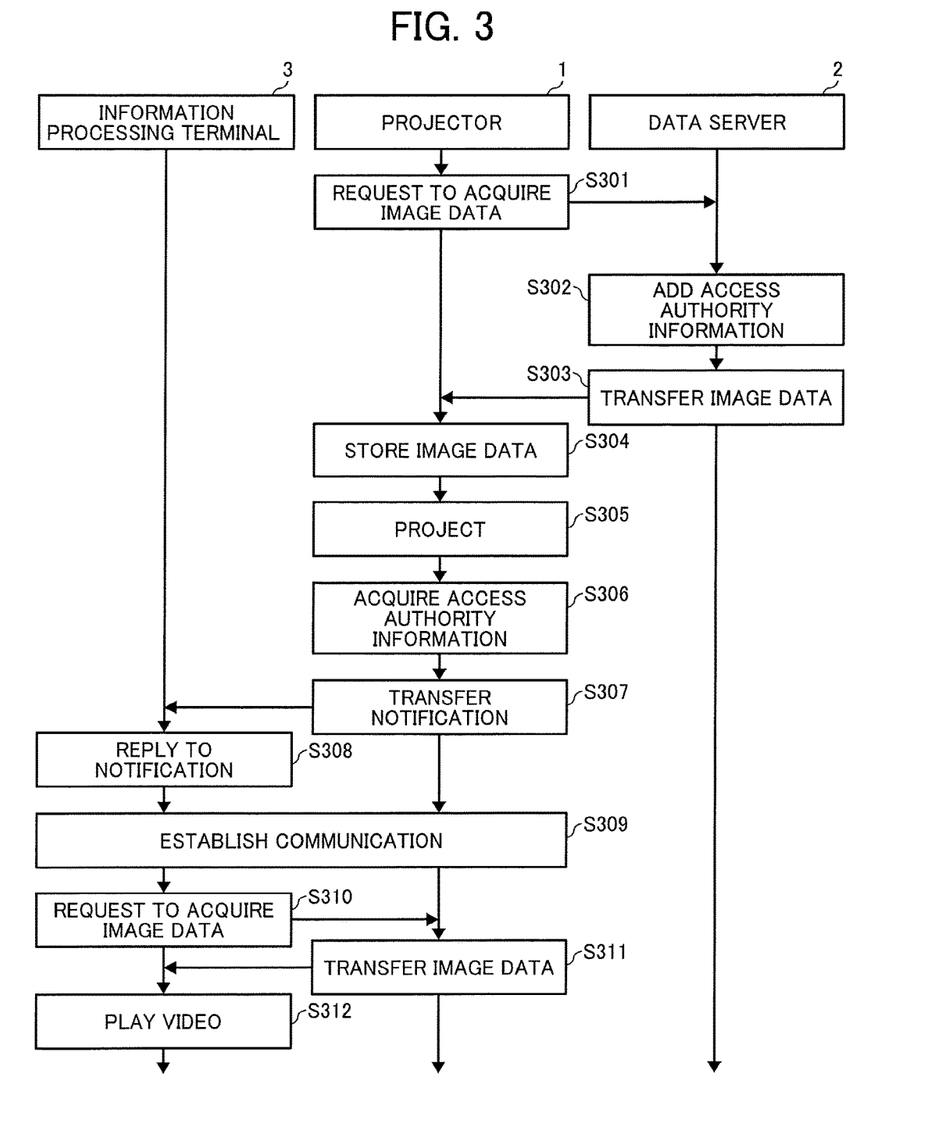
FIG. 3 is a sequence diagram illustrating an operation that displays same video as video projected by a projector on an information processing device in the video display system as an embodiment of the present invention.

Next, in the video display system in this embodiment, an operation that displays the same video as the video projected by a projector 1 on the information processing device 3 is described below with reference to FIG. 3. FIG. 3 is a sequence diagram illustrating an operation that displays the same video as the video projected by the projector 1 on the information processing device 3 in the video display system in this embodiment.

In the video display system in this embodiment, in displaying the same video as the video projected by the projector 1, first, the projector 1 requests the data server 2 to acquire the image data in S301.

After receiving the request, the data server 2 adds access authority information indicating whether or not it is prohibited to copy or store to the image data in S302 and transfers the image data to the projector 1 as the request source in S303.

Here, the operation of adding the access authority information in S302 is described below. The data server 2 in this embodiment adds the access authority information to the image data as is, synthesize the access authority information with the image data so that the access authority information is displayed as video, or synthesize the access authority information with the image data as digital watermarking.

If the data server 2 in this embodiment synthesizes the access authority information with the image data so that the access authority information is displayed as video or synthesizes the access authority information with the image data as digital watermarking, the data server 2 synthesizes the access authority information sot that the added access authority information is displayed by visible light or invisible light.

Next, the projector 1 stores the image data acquired from the data server 2 in S304, projects video based on the image data in S305, acquires the access authority information added to the image data in S306, and transmit notification by broadcasting to connect to another apparatus located in the predetermined area 7 in S307.

Here, the operation of acquiring the access authority information in S306 is described below. As described before, in the operation of adding the access authority information in S302, in this embodiment, the access authority information is added to the image data as is, synthesized with the image data so that the access authority information is displayed as video, or synthesized with the image data as digital watermarking.

If the access authority information is added to the image data as is, the projector 1 can acquire the access authority information by separating the access authority information as is.

By contrast, if the access authority information is synthesized with the image data so that the access authority information is displayed as video or synthesized with the image data as digital watermarking, the projector 1 cannot separate the access authority information as is. Therefore, the projector 1 extracts the access authority information from the image data in those cases.

Otherwise, if the access authority information is synthesized with the image data so that the access authority information is displayed as video or synthesized with the image data as digital watermarking, the projector 1 can project the image data and capture the projected access authority information to acquire the access authority information from the captured image.

If the access authority information is synthesized so that the access authority information is displayed by visible light or invisible light, it is required that the projector 1 can projects video by invisible light in addition to visible light. In addition, in this case, it is required that the projector 1 includes a capturing device such as a camera. If the access authority information is displayed by invisible light, it is required that the projector 1 include a capturing device such as a camera that can capture invisible light etc.

After the information processing device 3 moves into the predetermined area 7 by user move, the information processing device 3 replies notification in response to the notification transferred by the projector 1 in S308. Subsequently, the projector 1 establishes connection with the information processing device 3 in S303. In this case, the projector 1 communicates with the information processing device 3 using wireless communication. Therefore, known technologies such as ad-hoc mode and infrastructure mode etc. can be used for establishing communication.

After establishing communication, the information processing device 3 requests the projector 1 to acquire the image data in S310.

After receiving the request for acquiring the image data, the projector 1 adds the access authority information acquired in S306 to the image data stored in S304, i.e., the image data of the video currently projected, to transfer the image data to the information processing device 3 as the request source in S311.

After that, the information processing device 3 plays back the video based on the image data transferred by the projector 1 in S312.

Figure 4:
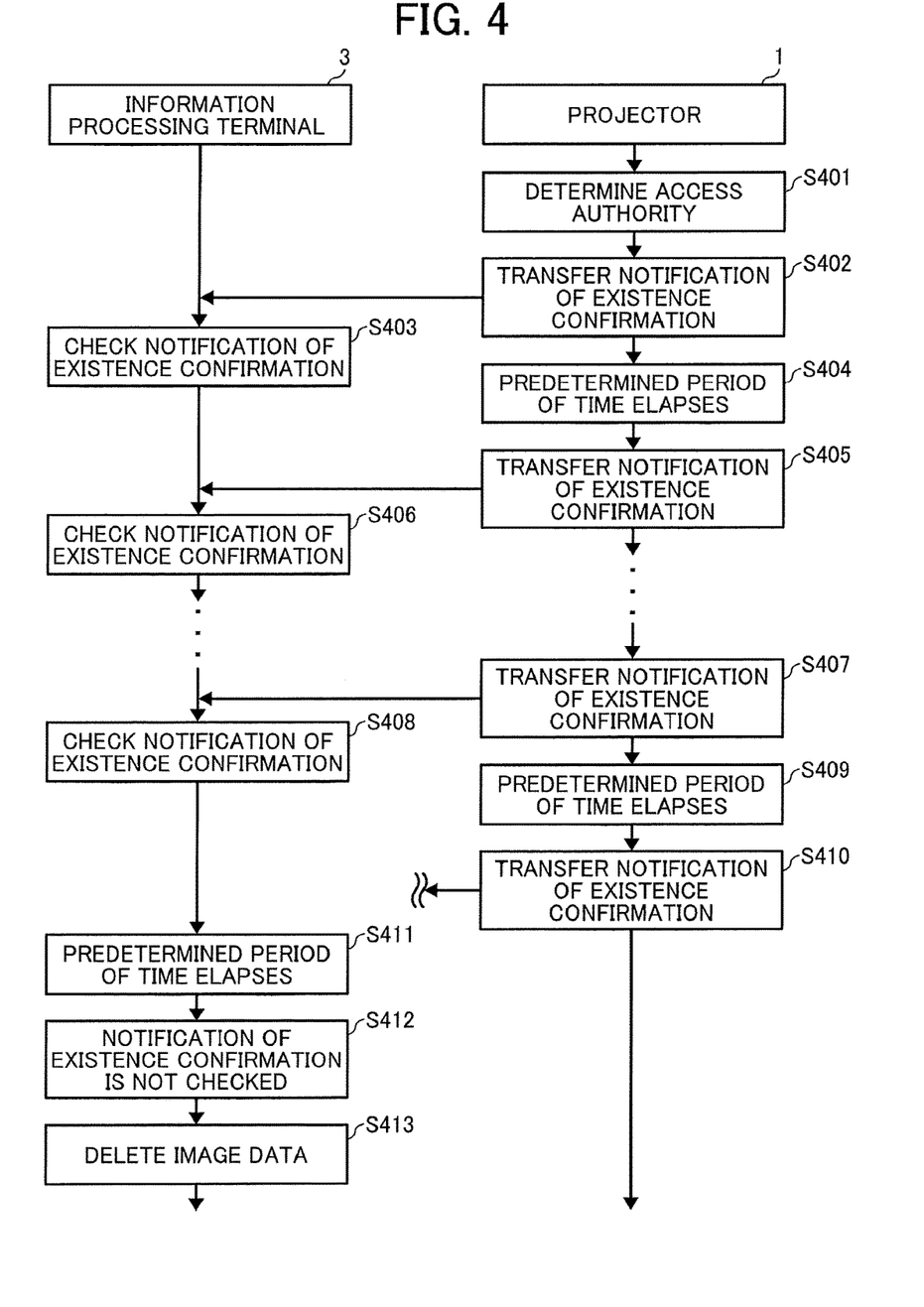
FIG. 4 is a sequence diagram illustrating an operation performed after the projector establishes connection with the information processing device in the video display system as an embodiment of the present invention.

Next, an operation performed after the projector 1 establishes connection with the information processing device 3 in the video display system in this embodiment is described below with reference to FIG. 4. FIG. 4 is a sequence diagram illustrating an operation performed after the projector 1 establishes connection with the information processing device 3 in the video display system in this embodiment.

In the video display system in this embodiment, after the projector 1 establishes connection with the information processing device 3, based on the access authority information acquired in S306, the projector 1 determines whether or not the image data transferred to the information processing device 3 is prohibited copying or storing in S401.

In S401, if it is determined that the image data transferred to the information processing device 3 is prohibited neither copying nor storing, the projector 1 determines that it is possible that the image data is brought outside the predetermined area 7, and the operation ends.

By contrast, in S401, if it is determined that the image data transferred to the information processing device 3 is prohibited copying or storing, the projector 1 determines that the image data is prohibited to be brought outside the predetermined area 7 and notifies the information processing device 3 of existence confirmation in S402, and the information processing device 3 confirms the existence confirmation notified by the projector 1 in S403. Here, the existence confirmation is notification that the projector 1 confirms if the information processing device 3 is located at the predetermined area 7.

After a predetermined period of time elapses since the last existence confirmation is notified in S404, the projector 1 again notifies the information processing device 3 of the existence confirmation in S405, and the information processing device 3 confirms the existence confirmation notified by the projector 1 in S406.

The projector 1 and the information processing device 3 repeat the operation in S402 to S406 regularly for a predetermined period of time in S402 to S409.

After that, if the information processing device 3 leaves from the predetermined area 7 by user move, the connection between the projector 1 and the information processing device 3 is disconnected, and the existence confirmation notification does not reach the information processing device 3 in S410.

In some cases, it is possible that the connection is disconnected temporarily due to poor radio wave condition etc. Therefore, it is possible that the projector 1 retries to notify the existence confirmation. In addition, if the connection between the projector 1 and the information processing device 3 is about to be disconnected, it is possible that the information processing device 3 reports to the user that the connection with the projector 1 is about to be disconnected by outputting sound or displaying a warning message on the screen.

As a result, after the predetermined period of time elapses since the last existence confirmation notification is confirmed in S411, the information processing device 3 cannot confirm the existence confirmation notified by the projector 1 in S412, the information processing device 3, in S413, deletes the image data transferred by the projector 1 in S311.

As described above, in the video display system in this embodiment, access authority information indicating whether or not it is prohibited to copy or store is added to the image data. Regarding the image data whose access authority is to prohibit copying or prohibit storing, the image data is deleted from the information processing device when the user leaves from the predetermined area 7 with the information processing device.

As a result, in the video display system in this embodiment, it is possible to limit handling the image data on the system, and it is possible to delete the image data surely without user operation.

Figure 5:
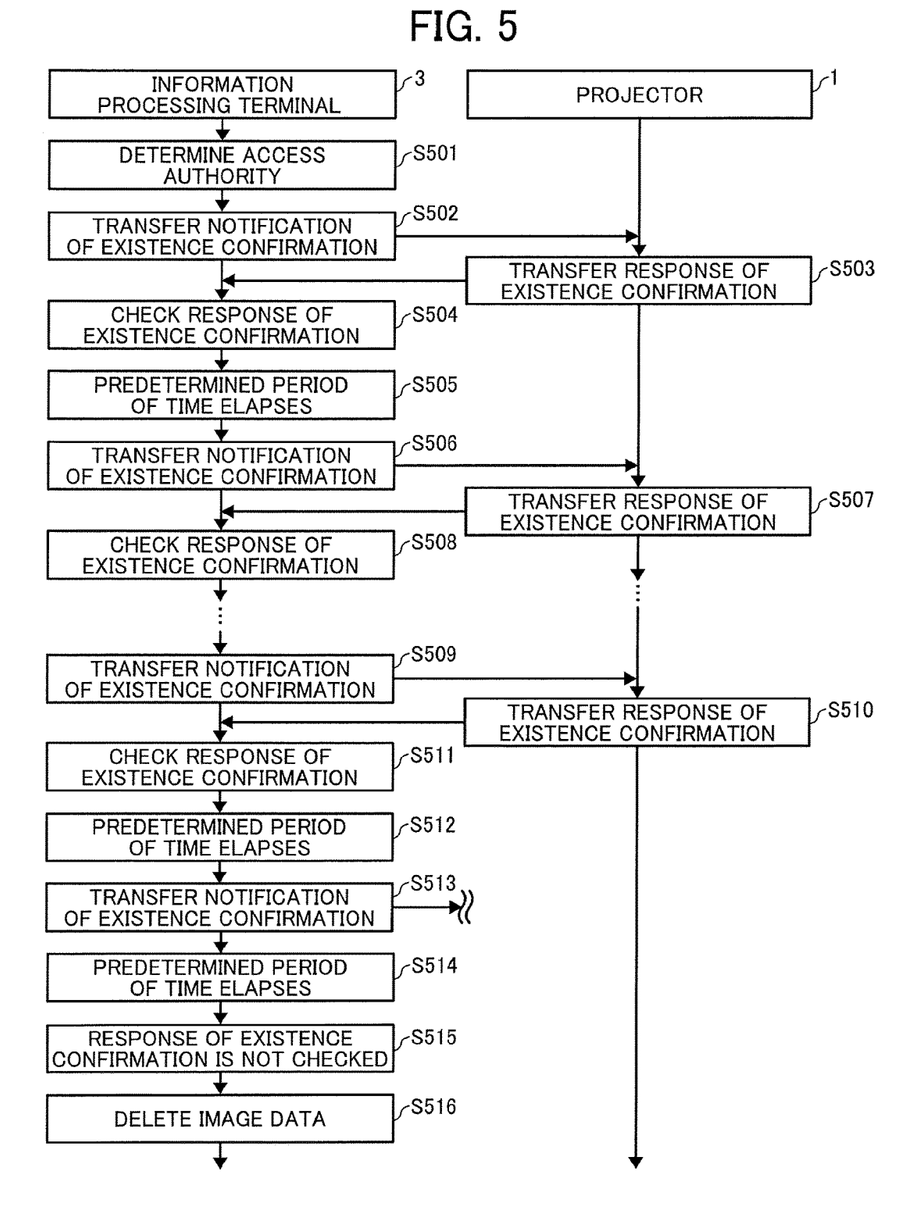
FIG. 5 is a sequence diagram illustrating an operation performed after the projector establishes connection with the information processing device in the video display system as an embodiment of the present invention.

In FIG. 4, the operation that the projector 1 notifies the information processing device 3 of the existence confirmation is described. Next, in FIG. 5, an operation that the information processing device 3 notifies the projector 1 of the existence confirmation is described. FIG. 5 is a sequence diagram illustrating an operation performed after the projector 1 establishes connection with the information processing device 3 in the video display system in this embodiment.

In the video display system in this embodiment, after the projector 1 establishes connection with the information processing device 3, based on the access authority information added to the image data transferred by the projector 1 in S311, the information processing device 3 determines whether or not the image data transferred by the projector 1 is prohibited copying or storing in S501.

In S501, if it is determined that the image data transferred by the projector 1 is prohibited neither copying nor storing, the information processing device 3 determines that the image data may be brought outside the predetermined area 7, and the operation ends.

By contrast, in S501, if it is determined that the image data transferred by the projector 1 is prohibited copying or storing, the information processing device 3 determines that the it is prohibited that image data is brought outside the predetermined area 7 and notifies the projector 1 of the existence confirmation in S502. Here, the existence confirmation is notification that the information processing device 3 has the projector 1 confirm that the information processing device 3 is located at the predetermined area 7.

Next, the projector 1 replies existence response in response to the existence confirmation notified by the information processing device 3 in S503, and the information processing device 3 confirms the existence confirmation replied by the projector 1 in S504.

After a predetermined period of time elapses since the last existence confirmation is notified in S505, the information processing device 3 again notifies the projector 1 of the existence confirmation in S506, the projector 1 replies the existence confirmation in response to the existence confirmation notified by the information processing device 3, and the information processing device 3 confirms the existence confirmation replied by the projector 1 in S508.

The projector 1 and the information processing device 3 repeat the operation in S502 to S508 regularly for a predetermined period of time in S502 to S512.

After that, if the information processing device 3 leaves from the predetermined area 7 by user move, the connection between the projector 1 and the information processing device 3 is disconnected, and the existence confirmation notification does not reach the projector 1 in S513.

In some cases, it is possible that the connection is disconnected temporarily due to poor radio wave condition etc. Therefore, the information processing device 3 may retry to notify the existence confirmation. In addition, if the connection between the projector 1 and the information processing device 3 is about to be disconnected, it is possible that the information processing device 3 reports to the user that the connection with the projector 1 is about to be disconnected by outputting sound or displaying a warning message on the screen.

As a result, after the predetermined period of time elapses since the last existence confirmation notification is confirmed in S514, the information processing device 3 cannot confirm the existence confirmation replied by the projector 1 in S515, the information processing device 3 determines that the information processing device is located outside the predetermined area 7 and, in S516, deletes the image data transferred by the projector 1 in S311.

As described above, in the video display system in this embodiment, access authority information indicating whether or not it is prohibited to copy or store is added to the image data. Regarding the image data whose access authority is to prohibit copying or prohibit storing, the image data is deleted from the information processing device when the user leaves from the predetermined area 7 with the information processing device.

As a result, in the video display system in this embodiment, it is possible to limit handling the image data on the system, and it is possible to delete the image data surely without user operation.

Figure 6:
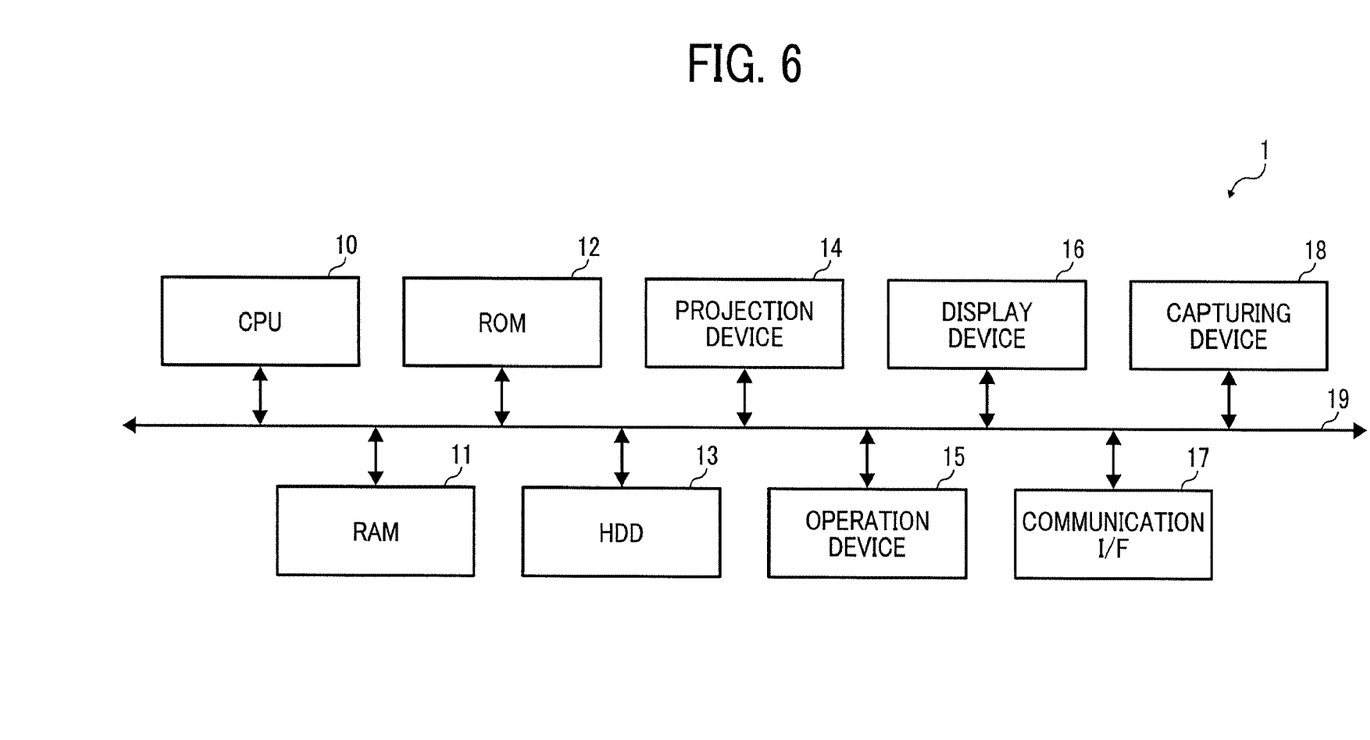
FIG. 6 is a block diagram illustrating a hardware configuration of the projector as an embodiment of the present invention.

Next, a hardware configuration of the projector 1, the data server 2, and the information processing device 3 in this embodiment is described below with reference to FIG. 6. FIG. 6 is a block diagram illustrating a hardware configuration of the projector 1 in this embodiment. In FIG. 6, the hardware configuration of the projector 1 is illustrated. However, the hardware configuration of the data server 2 and the information processing device 3 are similar to the hardware configuration of the projector 1.

As illustrated in FIG. 6, the projector 1 in this embodiment includes a central processing unit (CPU) 10, a random access memory (RAM) 11, a read only memory (ROM) 12, a hard disk drive (HDD) 13, a projection device 14, an operation device 15, a display device 16, a communication interface (I/F) 17, and a capturing device 18 connected with each other via a bus 19.

The CPU 10 is a processor and controls the whole operation of the projector 1. The RAM 11 is a volatile memory that can read/write information at high speed and is used as a work area when the CPU 10 processes information.

The ROM 12 is a read-only non-volatile storage medium and stores programs such as firmware.

The HDD 13 is a nonvolatile storage medium that can read/write information and stores various data such as image data etc., an operating system (OS), various control programs, and various programs such as application programs (e.g., a data management program).

The projection device 14 is hardware to implement a function specific to the projector 1. That is, the projection device 14 forms an optical image by modulating a light flux emitted from a light source and projects the formed projection image on a projection surface such as a wall and screen etc. It should be noted that the projection device 14 can project and display not only visible light but also invisible light. It is unnecessary that the data server 2 and the information processing device 3 include the projection device 14.

The operation device 15 is a user interface to input data to the projector 1 and is implemented by input devices such as a keyboard, a mouse, an input button, and a touch panel etc. It is unnecessary that the data server 2 includes the operation device 15.

The display device 16 is a visual user interface for checking a status of the projector 1 and implemented by a display device such as a liquid crystal display (LCD) and an output device such as a light emitting diode (LED) etc. It is unnecessary that the data server 2 includes the display device 16.

The capturing device 18 is a solid-state image sensor such as charge-coupled device (CCD) or complementary metal oxide semiconductor (CMOS) etc. that captures surroundings, converts into an electrical signal, and inputs into the projector 1. It should be noted that the capturing device 18 can capture not only visible light but also invisible light. It is unnecessary that the data server 2 and the information processing device 3 include the capturing device 18.

The communication I/F 19 is an interface that the projector 1 communicates with other apparatuses and interfaces such as Ethernet, USB, Bluetooth, Wi-Fi, FeliCa, PCIe, and IEEE standard are used.

In this hardware configuration described above, programs stored in storage devices such as the ROM 12 and the HDD 13 etc. are read to the RAM 11, and a software controlling unit is constructed by executing operation in accordance with the loaded programs in the RAM 11 by the CPU 10.

Functional blocks that implement capabilities of the projector 1, the data server 2, and the information processing device 3 of this embodiment are constructed by a combination of the software controlling units described above and hardware.

Figure 7:
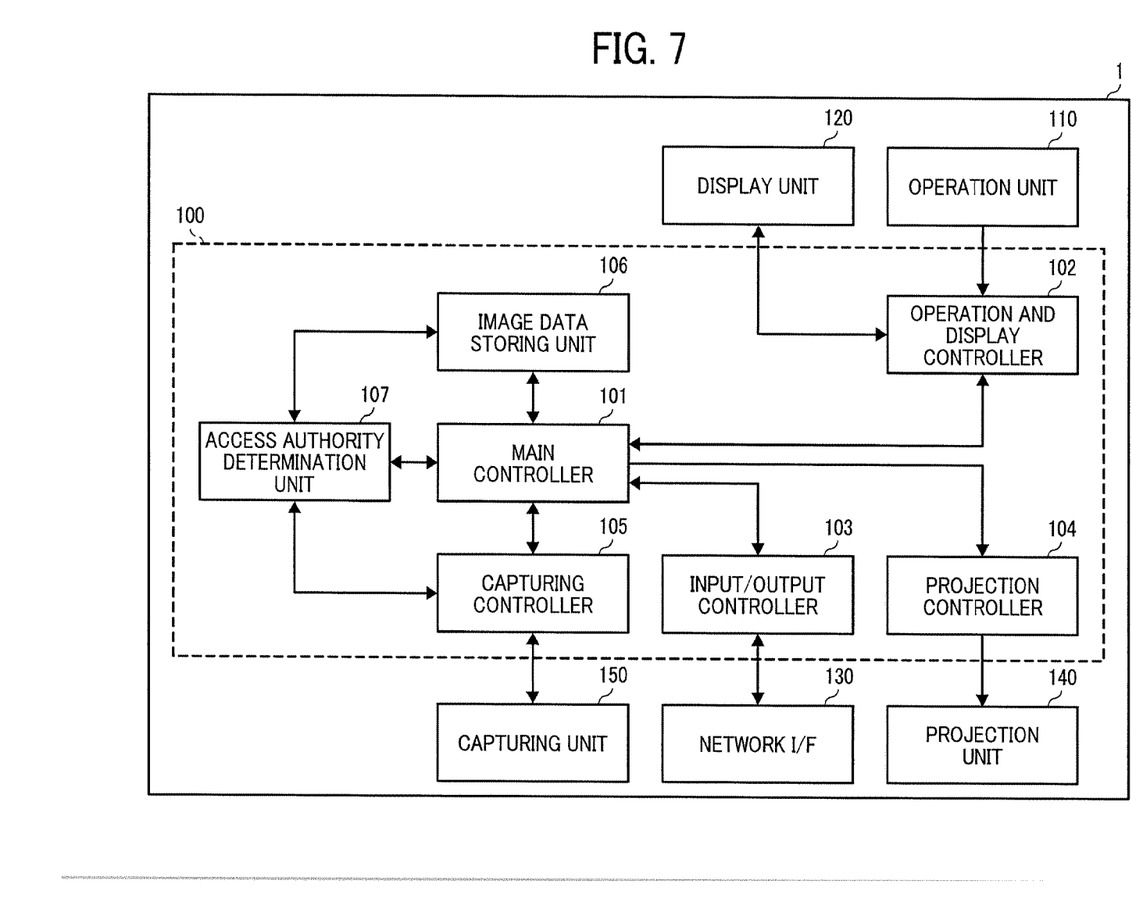
FIG. 7 is a block diagram illustrating a functional configuration of the projector as an embodiment of the present invention.

Next, a functional configuration of the projector 1 in this embodiment is described below with reference to FIG. 7. FIG. 7 is a block diagram illustrating a functional configuration of the projector 1 in this embodiment.

As illustrated in FIG. 7, the projector 1 in this embodiment includes a controller 100, an operation unit 110, a display unit 120, a network I/F 130, a projection unit 140, and a capturing unit 150. In addition, the controller 100 includes a main controller 101, an operation and display controller 102, an input/output controller 103, a projection controller 104, a capturing controller 105, an image data storing unit 106, and an access authority determination unit (an access authority determining unit) 107.

The operation unit 110 is an input interface to operate the projector 1 directly and input information into the projector 1 by user operation. The operation unit 110 is implemented by the operation device 15 in FIG. 6.

The display unit 120 is an output interface that displays statuses of the projector 1 visually and also an input interface as a touch panel to operate the projector 1 directly and input information into the projector 1 by user operation. That is, the display unit 120 includes a function that displays images to accept user operation. The display unit 120 is implemented by the display device 16 in FIG. 6.

The network I/F 130 is an interface that the projector 1 communicates with other apparatuses such as the data server 2 and the information processing device 3 etc. via the network, and interfaces such as Ethernet, USB, Bluetooth, Wi-Fi, FeliCa, PCIe, and IEEE standard are used. The network I/F 130 is implemented by the communication I/F 17 in FIG. 6.

That is, the projection unit 140, under control of the projection controller 104, is an output interface that forms an optical image by modulating a light flux emitted from a light source and projects the formed projection image on a projection surface such as a wall and screen etc. The projection unit 140 is implemented by the projection device 14 in FIG. 6. That is, in this embodiment, the projection unit 140 functions as a video display unit.

The capturing unit 150 is a solid-state image sensor such CCD and CMOS etc. and an input interface that captures surroundings, converts into an electrical signal, and inputs into the projector 1. The capturing unit 150 is implemented by the capturing device 18 in FIG. 6.

The controller 100 is implemented by a combination of software and hardware. That is, the controller 100 is constructed by a software controlling unit is constructed, after reading programs stored in storage devices such as the ROM 12 and the HDD 13 etc. to the RAM 11 by the CPU 10, by executing operation in accordance with the loaded programs by the CPU 10 and hardware such as integrated circuits etc.

The main controller 101 controls each unit included in the controller 100 and commands each unit in the controller 100. The main controller 101 controls the input/output controller 103 to access another apparatus via the network I/F 130. That is, in this embodiment, the main controller 101 functions as a detector.

Under control of the main controller 101, the operation and display controller 102 displays a screen on the display unit 120 and inputs information, signals, and commands input via the operation unit 110 into the main controller 101. Subsequently, the main controller 101 passes commands to each unit in the controller 100 in accordance with the information, signals, and commands input from the operational display controller 102.

Under control of the main controller 101, the input/output controller 103 transfers information, signals, and commands into other apparatuses via the network IN 130 and inputs information, signals, and commands input via the network I/F 130 into the main controller 101. Subsequently, the main controller 101 passes commands to each unit in the controller 100 in accordance with the information, signals, and commands input from the input/output controller 103. That is, in this embodiment, the input/output controller 103 functions as a data transmitter.

Under control of the main controller 101, the projection controller 104 controls and drives the projection unit 140. Under control of the main controller 101, the capturing controller 105 controls and drives the capturing unit 150. The image data storing unit 106 stores image data acquired from the data server 2.

Based on the access authority information added to the image data acquired from the data server 2, the access authority determination unit 107 determines whether or not the image data is prohibited copying or storing.

Figure 8:
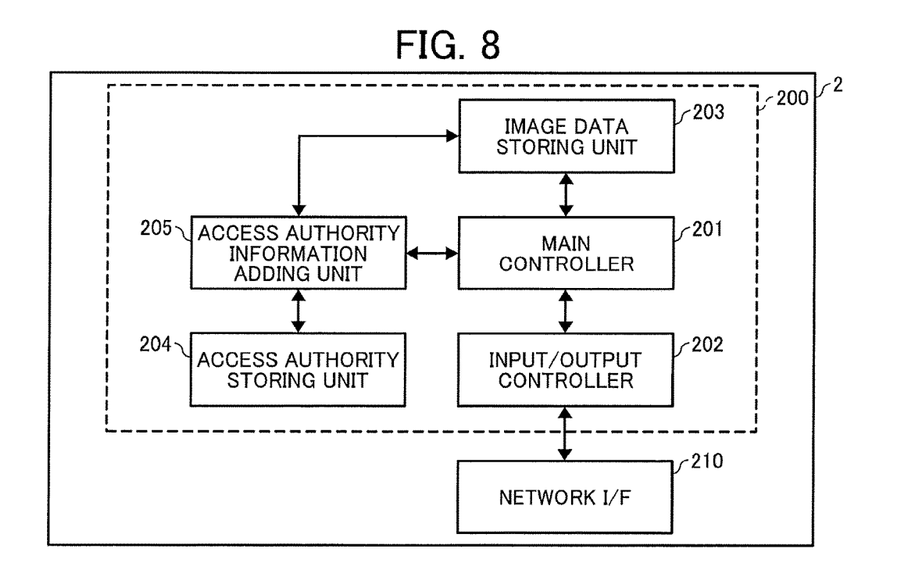
FIG. 8 is a block diagram illustrating a functional configuration of a data server as an embodiment of the present invention.

Next, a functional configuration of the data server 2 in this embodiment is described below with reference to FIG. 8. FIG. 8 is a block diagram illustrating a functional configuration of the data server 2 in this embodiment.

As illustrated in FIG. 8, the data server 1 in this embodiment includes a controller 200 and a network I/F 210. The controller 200 includes a main controller 201, an input/output controller 202, an image data storing unit 203, an access authority storing unit 204, and an access authority information adding unit 205.

The network I/F 210 is an interface that the data server 2 communicates with other apparatuses such as the projector 1 etc. via the network, and interfaces such as Ethernet, USB, Bluetooth, Wi-Fi, FeliCa, PCIe, and IEEE standard are used. The network I/F 210 is implemented by the communication I/F 17 in FIG. 6.

The controller 200 combines software and hardware. That is, the controller 200 is constructed by a software controlling unit is constructed, after reading programs stored in storage devices such as the ROM 12 and the HDD 13 etc. to the RAM 11 by the CPU 10, by executing operation in accordance with the loaded programs by the CPU 10 and hardware such as integrated circuits etc.

The main controller 201 controls each unit included in the controller 200 and commands each unit in the controller 200. That is, in this embodiment, the main controller 201 functions as a detector. The main controller 101 controls the input/output controller 202 to access another apparatus via the network I/F 210.

Under control of the main controller 201, the input/output controller 202 transfers information, signals, and commands to other apparatuses via the network I/F 210 and inputs information, signals, and commands input via the network I/F 210 into the main controller 201. Subsequently, the main controller 201 passes commands to each unit in the controller 200 in accordance with the information, signals, and commands input from the input/output controller 202.

The image data storing unit 203 stores image data to be transferred to the projector 1. The access authority storing unit 204 stores access authority to be added to each of the image data stored in the image data storing unit 203.

The access authority information adding unit 205 refers to relationship between the access authority stored in the access authority storing unit 204 and the image data and adds information on access authority to the image data stored in the image data storing unit 203. It should be noted that the access authority information adding unit 205 adds the information on access authority to the image data as is, synthesizes the access authority information with the image data so that the access authority information is displayed as video, or synthesizes the access authority information with the image data as digital watermarking.

Figure 9:
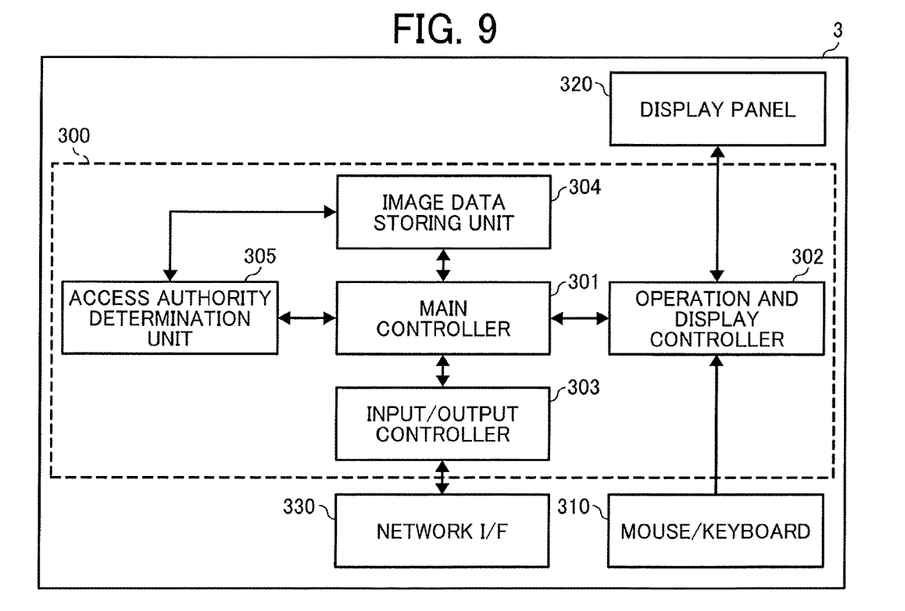
FIG. 9 is a block diagram illustrating a functional configuration of the information processing device as an embodiment of the present invention.

Next, a functional configuration of the information processing device 3 in this embodiment is described below with reference to FIG. 9. FIG. 9 is a block diagram illustrating a functional configuration of the information processing device 3.

As illustrated in FIG. 9, the information processing device 3 in this embodiment includes a controller 300, a mouse/keyboard 310, a display panel 320, and a network I/F 330. In addition, the controller 300 includes a main controller 301, an operation and display controller 302, an input/output controller 303, an image data storing unit 304, and an access authority determination unit 305.

The mouse/keyboard 310 is an input interface to operate the information processing device 3 directly by user operation or input information into the information processing device 3 by user operation. The mouse/keyboard 310 is implemented by the operation device 15 in FIG. 6.

The display panel 320 is both an output interface that displays status of the information processing device 3 visually and an input interface to operate the information processing device 3 directly by user operation or input information into the information processing device 3 by user operation. That is, the display panel 320 includes a function that displays images to accept user operation. The display panel 320 is implemented by the operation device 15 and the display device 16 in FIG. 6. That is, in this embodiment, the display panel 320 functions as a notification unit.

The network I/F 330 is an interface that the information processing device 3 communicates with other apparatuses such as the projector 1 etc. via the network, and interfaces such as Ethernet, USB, Bluetooth, Wi-Fi, FeliCa, PCIe, and IEEE standard are used. The network I/F 330 is implemented by the communication I/F 17 in FIG. 6.

The controller 300 combines software and hardware. That is, the controller 300 is constructed by a software controlling unit is constructed, after reading programs stored in storage devices such as the ROM 12 and the HDD 13 etc. to the RAM 11 by the CPU 10, by executing operation in accordance with the loaded programs by the CPU 10 and hardware such as integrated circuits etc.

The main controller 301 controls each unit included in the controller 300 and commands each unit in the controller 300. That is, in this embodiment, the main controller 301 functions as an access controller. The main controller 301 controls the input/output controller 303 to access another apparatus via the network I/F 330.

Under control of the main controller 301, the operation and display controller 302 displays a screen on the display panel 320 and inputs information, signals, and commands input via the mouse/keyboard 310 and the display panel 320 into the main controller 301. Subsequently, the main controller 301 passes commands to each unit in the controller 300 in accordance with the information, signals, and commands input from the operational display controller 302.

Under control of the main controller 301, the input/output controller 303 transfers information, signals, and commands to another apparatus via the network I/F 330 and inputs information, signals, and commands input via the network I/F 330 into the main controller 301. Subsequently, the main controller 301 passes commands to each unit in the controller 300 in accordance with the information, signals, and commands input from the input/output controller 303.

The image data storing unit 304 stores image data acquired from the projector 1. Based on the access authority information added to the image data acquired from the projector 1, the access authority determination unit 305 determines whether or not the image data is prohibited copying or storing.

As described above, in the video display system in this embodiment, access authority information indicating whether or not it is prohibited to copy or store is added to the image data. Regarding the image data whose access authority is to prohibit copying or prohibit storing, the image data is deleted from the information processing device when the user leaves from the predetermined area 7 with the information processing device.

As a result, in the video display system in this embodiment, it is possible to limit handling the image data on the system, and it is possible to delete the image data surely without user operation.

In this embodiment, as described before with reference to FIGS. 1 and 2, in the video display system, the projector 1 transfers the image data to the information processing device 3 located at the predetermined area 7. Other than that, in the video display system in this embodiment, the data server 2 may transfer image data to the information processing device 3 located at the predetermined area 7.

Figure 10:
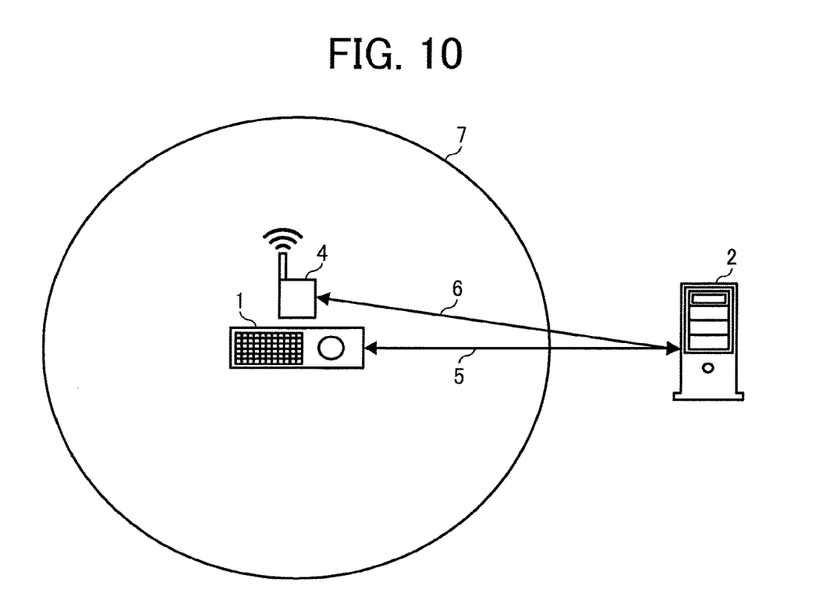
FIG. 10 is a diagram illustrating a video display system as an embodiment of the present invention.
Figure 11:
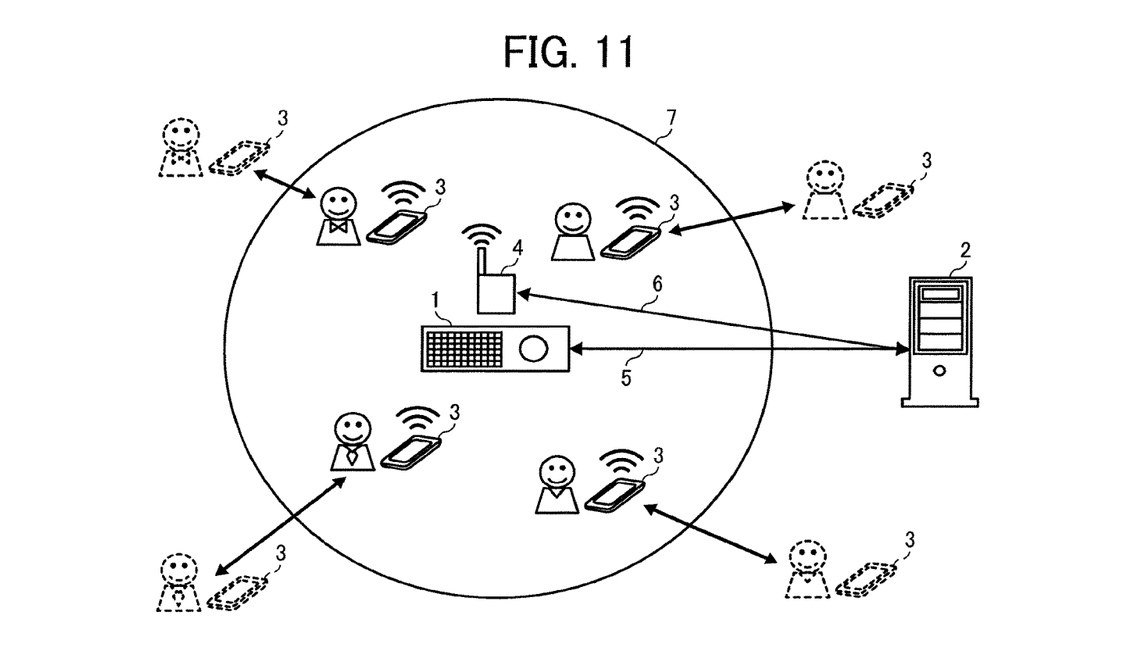
FIG. 11 is a diagram illustrating a video display system as an embodiment of the present invention.

Here, an operation of a video display system that the data server 2 may transfer image data to the information processing device 3 located at the predetermined area 7 is described below with reference to FIGS. 10 and 11. FIGS. 10 and 11 are diagrams illustrating the video display system in this embodiment.

As illustrated in FIG. 10, in the video display system in this embodiment, a projector 1 is connected to a data server 2 via a network 5, and the data server 2 is connected to a communication apparatus 4 via a network 6.

The data server 2 stores the image data and transfers the image data to the projector 1 on demand via the network 5.

In addition, for example, the communication apparatus 4 includes a short-range wireless communication function such as BLE, Bluetooth, and Wi-Fi etc., and the communication apparatus 4 can communicate with another apparatus including the short-range wireless communication function located in the predetermined area 7. That is, the projector 1 can communicate with other apparatus within the predetermined area 7 where radio wave of the short-range wireless communication reaches. However, outside the predetermined area 7, the projector 1 cannot communicate with the other apparatus since the radio wave does not reach.

As a result, as illustrated in FIG. 11, after a user moves into the predetermined area 7 with the information processing device 3, the communication apparatus 4 can communicate with the information processing device 3 using the short-range wireless communication. By contrast, after the user leaves from the predetermined area 7 with the information processing device 3, the communication between the communication apparatus 4 and the information processing device 3 is disconnected.

Just like the network 5, the network 6 is an intranet such as an office LAN etc., and it is possible to implement the network 6 using a network compatible with interfaces such as Ethernet, USB, Bluetooth, Wi-Fi, FeliCa, PCIe, VGA, DVI, and the IEEE standard etc.

In the video display system configured as described above, the data server 2 transfers same video as video projected by the projector 1 to the information processing device 3 located at a predetermined area 7 via the communication apparatus 4.

Other than that, in the video display system in this embodiment, the data server 2 may also function as the communication apparatus 4 and transfer image data to the information processing device 3 located at the predetermined area 7 directly. Other than that, in the video display system in this embodiment, the projector 1 may also function as the data server 2.

As described before, in the video display system in this embodiment, access authority information indicating whether or not it is prohibited to copy or store is added to the image data. Regarding the image data whose access authority is to prohibit copying or prohibit storing, the image data is deleted from the information processing device when the user leaves from the predetermined area 7 with the information processing device.

Other than that, in the video display system in this embodiment, in addition to whether or not the image data is prohibited copying or storing, access authority information indicating whether or not it is prohibited to acquire image data may be added to the image data, and regarding image data whose access authority indicates that it is prohibited to acquire, the information processing device 3 may not be allowed to acquire the image data even if the information processing device is located at the predetermined area 7.

In the embodiments described above, a data management system that may limit data handling is provided.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A data management apparatus, comprising:
    circuitry configured to:
    determine whether an information processing apparatus is located within a predetermined area; and
    receive data together with access authority information indicating whether the information processing apparatus is allowed to store or copy the data when the information processing apparatus is determined as located outside the predetermined area;
    transmit the data to the information processing apparatus in response to a request consistent with the access authority information; and
    after the data is transmitted to the information processing apparatus and when the access authority information indicates that the information processing apparatus is not allowed to store or copy the data when the information processing apparatus is determined as located outside the predetermined area, cause the information processing apparatus to
    determine whether the information processing apparatus is located outside the predetermined area, and
    delete the data transmitted to the information processing apparatus when the information processing apparatus is determined as located outside the predetermined area;
    wherein the data corresponds to providing a video, and
    the data management apparatus further comprises a display configured to display the video provided by the data:
    wherein information regarding the access authority information is embedded in the video, and the circuitry is configured to
    capture an image from the video displayed by the display, and
    extract the access authority information from the captured image.

2. The data management apparatus according to claim 1, wherein the circuitry is further configured to prohibit the information processing apparatus from copying the transmitted data.

3. The data management apparatus according to claim 1, wherein the circuitry is further configured to prohibit transmitting the data to the information processing apparatus when the information processing apparatus is determined as located outside the predetermined area.

4. The data management apparatus according to claim 1, wherein the circuitry is further configured to:
transmit notification messages at a predetermined interval, the notification messages causing the information processing apparatus to determine that the information processing apparatus is located outside the predetermined area when the information processing apparatus, within a predetermined period of time after receiving one of the transmitted notification messages, fails to receive another notification message from the data management apparatus.

5. The data management apparatus according to claim 1, wherein the circuitry is further configured to:
receive notification messages from the information processing apparatus; and
transmit reply messages in response to the received notification messages, respectively, the reply messages causing the information processing apparatus to determine that the information processing apparatus is located outside the predetermined area when the information processing apparatus, within a predetermined period of time after receiving one of the transmitted reply messages, fails to receive another reply message from the data management apparatus.

6. A method of managing data for a data management apparatus, the method comprising:
determining, by circuitry of the data management apparatus, whether an information processing apparatus is located within a predetermined area;
receiving data together with access authority information indicating whether the information processing apparatus is allowed to store or copy the data when the information processing apparatus is determined as located outside the predetermined area;
transmitting data to the information processing apparatus in response to a request consistent with the access authority information; and
after the data is transmitted to the information processing apparatus and when the access authority information indicates that the information processing apparatus is not allowed to store or copy the data when the information processing apparatus is determined as located outside the predetermined area, causing, by the circuitry of the data management apparatus, the information processing apparatus to
determine whether the information processing apparatus is located outside the predetermined area, and
delete the data transmitted to the information processing apparatus when the information processing apparatus is determined as located outside the predetermined area;
wherein the data corresponds to providing a video, and
the data management apparatus further comprises a display configured to display the video provided by the data;
wherein information regarding the access authority information is embedded in the video, and the method further comprises
capturing an image from the video displayed by the display, and
extracting the access authority information from the captured image.

7. A non-transitory, computer-readable recording medium storing a program that, when executed by one or more processors, causes the one or more processors to implement a method of managing data for a data management apparatus, comprising:
determining whether an information processing apparatus is located within a predetermined area;
receiving data together with access authority information indicating whether the information processing apparatus is allowed to store or copy the data when the information processing apparatus is determined as located outside the predetermined area;
transmitting data to the information processing apparatus in response to a request consistent with the access authority information; and
after the data is transmitted to the information processing apparatus and when the access authority information indicates that the information processing apparatus is not allowed to store or copy the data when the information processing apparatus is determined as located outside the predetermined area, causing the information processing apparatus to
determine whether the information processing apparatus is located outside the predetermined area, and
delete the data transmitted to the information processing apparatus when the information processing apparatus is determined as located outside the predetermined area;
wherein the data corresponds to providing a video, and
the data management apparatus further comprises a display configured to display the video provided by the data;
wherein information regarding the access authority information is embedded in the video, and the method further comprises
capturing an image from the video displayed by the display, and
extracting the access authority information from the captured image.

* * * * *